United States Patent [19]

Waite

[11] Patent Number: 4,669,088

[45] Date of Patent: May 26, 1987

[54] OFF-AXIS UNSTABLE RING RESONATOR WITH 90 DEGREE BEAM ROTATOR

[75] Inventor: Thomas R. Waite, Canoga Park, Calif.

[73] Assignee: Rockwell International Corporation, El Segundo, Calif.

[21] Appl. No.: 660,777

[22] Filed: Oct. 15, 1984

[51] Int. Cl.$^4$ ................................................ H01S 3/08
[52] U.S. Cl. ........................................ 372/95; 372/96; 372/107; 372/108; 372/99
[58] Field of Search .................... 372/94, 95, 98, 107, 372/108, 101, 700, 93, 96, 99

[56] References Cited

U.S. PATENT DOCUMENTS

| | | | |
|---|---|---|---|
| 4,079,340 | 3/1978 | Weiner et al. | 372/95 |
| 4,433,418 | 3/1984 | Smith | 372/95 |
| 4,577,324 | 3/1986 | Nishida et al. | 372/95 |

OTHER PUBLICATIONS

Goryachkin et al; "Properties of Unstable Resonators with Field Rotation 11 Experimental Results"; S.JQE 9 (9), Sep. 79.

Anan'ev et al; "Prop. of Unstable Resonators with Field Rot. 1, Theoretical Principles"; Sov. J. QE 9 (9), Sep. 1979.

Kuprenyuk et al; "Wave Approx. Calculation of an Unstable Resonator with Field Rotation"; SJQE 13 (12), Dec. 1983.

Primary Examiner—Leon Scott, Jr.
Attorney, Agent, or Firm—H. Fredrick Hamann; Harry B. Field; Lawrence N. Ginsberg

[57] ABSTRACT

An improvement for an off-axis, unstable, ring-resonator laser wherein the feedback beam 16 is rotated 90° by a 90° rotator 18 and is then magnified by magnification means 22 so that the dimensions of the rotated, magnified beam 24 will correspond to the dimensions of the gain medium 12 of the laser.

3 Claims, 5 Drawing Figures

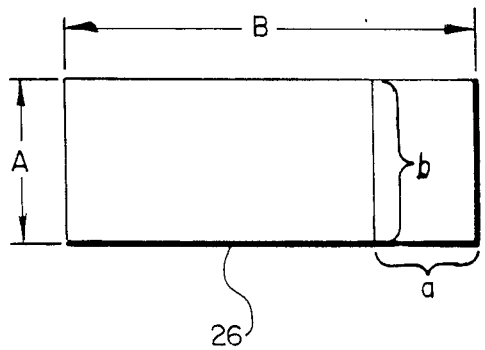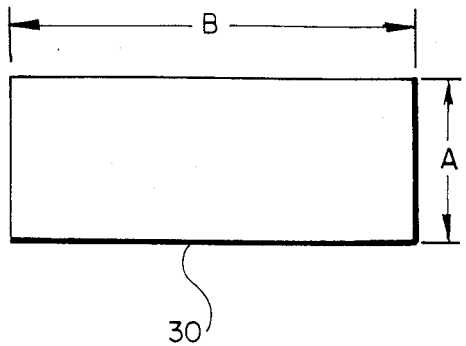
Fig.2.a.  Fig.2.b.  Fig.2.c.
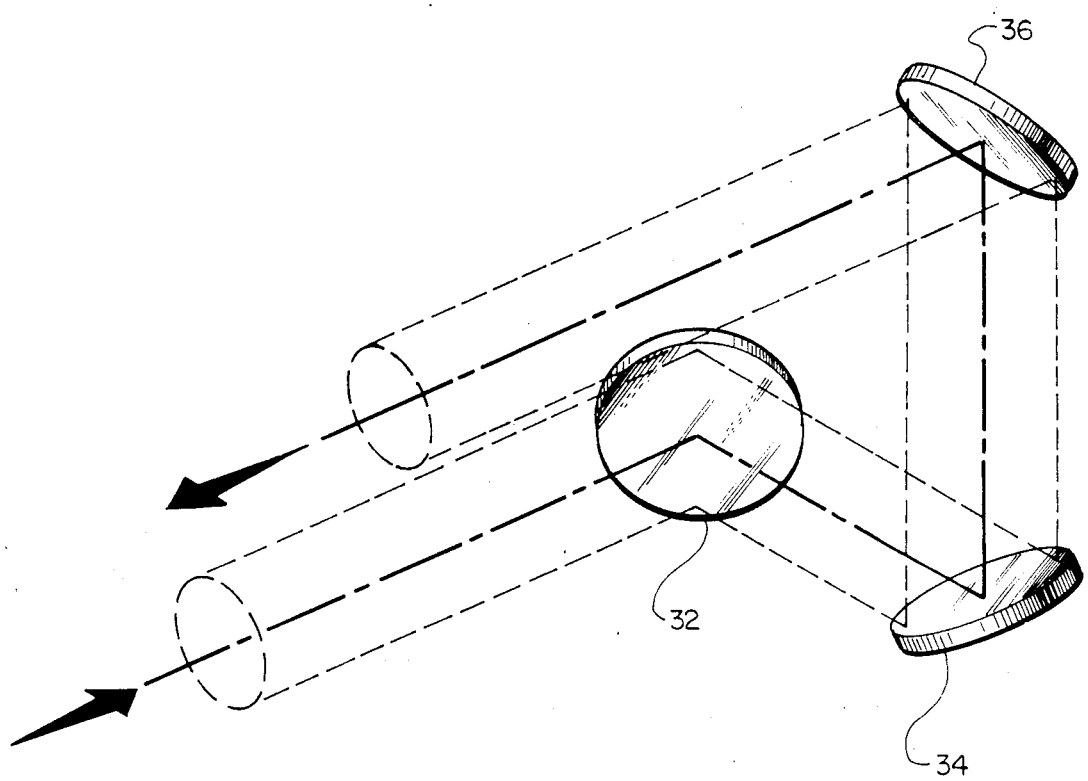
Fig.3.

OFF-AXIS UNSTABLE RING RESONATOR WITH 90 DEGREE BEAM ROTATOR

BACKGROUND OF THE INVENTION

1. This invention relates to unstable ring-resonator lasers and especially to off-axis, unstable, ring-resonator lasers with a 90° feedback-beam rotator.

2. High-energy lasers exhibit beam non-unifority due to gain-medium non-uniformities. Off-axis unstable resonators are subject to instabilities and wasted power because the self-reproducing ray travels at the edge of the gain medium.

OBJECT OF THE INVENTION

An object of this invention is to provide an off-axis, unstable, ring-resonator laser having no internal hole in the output beam, no multimoding, no special losses and no mode instability.

Another object is to eliminate the second lowest mode in such a laser.

A further object is to average out beam intensity variations in such a laser.

Yet another object is to minimize or eliminate beam aberrations resulting from medium inhomogeneities in a high aspect ratio gain medium.

A further object is to provide a means for spectral control of such a laser.

Yet another object is to reduce the so-called "sugar scoop" effect in such a laser.

A further object is to reduce the severity of high spatial frequencies across the wavefront of the laser beam.

Other objects, advantages and novel features of the present invention will become apparent from the following detailed description of the invention when considered in conjunction with the accompanying drawing.

SUMMARY OF THE INVENTION

The invention comprises an off-axis, unstable, ring-resonator laser in which the feedback beam in each pass is rotated by 90° and is then magnified, geneally astigmatically, to fill the dimensions of the gain medium.

If the gain medium has a high aspect ratio, as in linear chemical lasers, a 90° rotation alternately interchanges the long and short beam dimensions on consecutive round trips so that there is a low effective fresnel number on alternate passes. This procedure more quickly ejects wavefront distortion from the resonator.

Off-axis resonators with feedback taken from the edge of the beam as it leaves the gain medium can have a self-reproducing ray situated well away from the edge of the gain medium if the feedback beam is rotated by 90°. This permits design of unstable resonators having output beams without a hole inside the beam.

BRIEF DESCRIPTION OF THE DRAWING

FIGS. 2a-c are a schematic illustration of a situation in which astigmatic magnification of the feedback beam is unnecessary.

FIG. 3 is a schematic illustration of a 3-mirror out-of-plane rotator.

The same elements or parts throughout the figures of the drawing are designated by the same reference characters.

DETAILED DESCRIPTION OF THE INVENTION

Figure 1:
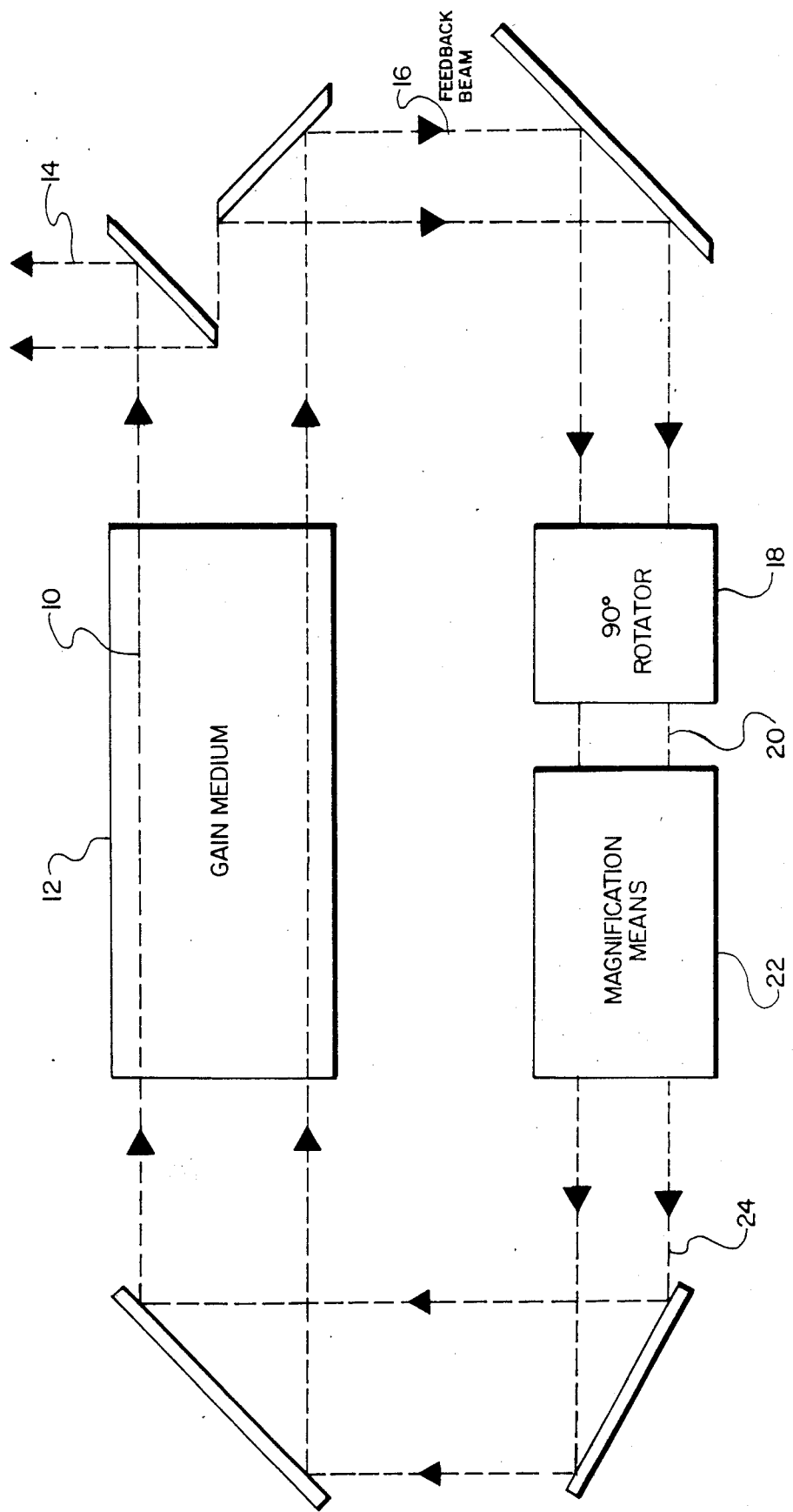
FIG. 1 is a schematic drawing of the invention.

An embodiment of the invention is shown in FIG. 1. Here, a laser beam 10 is sent through the gain medium 12 of an unstable resonator type of high-energy laser. A portion of the beam 10 is withdrawn from the output 14 and sent back as a feedback beam 16 to a means 18 for rotating the beam by 90°. The rotated beam 20 is then sent through a magnification means 22 and the magnified and rotated beam 24 is sent back through the gain medium 12.

One type of 90° rotator 18 which may be used comprises a set of three out-of-plane mirrors. Although out-of-plane mirrors are well known in the art, they have heretofore not been utilized with off-axis, unstable ring-resonator lasers. (See FIG. 3 where the mirrors are 32, 34 and 36). Magnifiers which may be used comprise a set of toric mirrors, or two sets of cylindrical mirrors, or lenses in place of the mirrors.

In general, the magnification has to be astigmatic to cause different magnifications on the x and y axes of the beam, because the aspect ratio of the feedback beam is different after rotation than the aspect ratio of the gain medium which, preferably, should be more or less exactly filled by the magnified beam. There is one exception to astigmatic magnification—the magnification can be anastigmatic if the situation is as shown in FIG. 2. If a laser beam 26 has the proportions A and B of which a and b are the dimensions of a beam 28 which is to be fed back and rotated 90°, beam 28 can be magnified by the same factor, M, on both axes to provide a rotated and magnified beam 30 with the original dimensions A and B. Thus, if $(A/B)=(a/b)$ $A=Ma$ and $B=Mb$, the laser is anastigmatic.

The rotation of the beam by 90° provides mode control along the long transverse axis of a linear, ring, unstable resonator by converting it to the short transverse axis on alternate passes. It also aids mode control by keeping the self-reproducing rays away from the edge of the mirror in this off-axis resonator. Because the feedback beam uses only a short off-axis section of the amplified beam, the lower (non-uniform) transverse modes cannot reproduce themselves because of symmetry.

The 90° beam rotation also drives high spatial frequency disturbances on the long axis, for example, due to media inhomogeneities and/or high fresnel number diffraction effects, out of the resonator on the next pass. Because only a short section along the long transverse axis is fed back, more gentle spatial frequencies due to mirror bowing and/or thermal flow velocity or pressure gradients across the nozzle array appear uniform across the front of the feedback beam.

The 90° rotation also reduces the large number of photon round trips some photons would make in a high aspect ratio resonator because the average number of photon round trips on the short transverse axis need not be much greater than one.

The off-axis configuration (with 90° rotation) reduces the length of the hot scraper edge very significantly on high aspect ratio resonators. It eliminates the long narrow slit in the cooled scraper mirror.

The rotation also reduces the "sugar scoop" effect. After two passes, the upstream portion of the beam has rotated 180° to the downstream portion. It should combat other intensity non-uniformity effects by not allowing them to act coherently over successive passes and by feeding back a more local, more uniform, small section of the beam.

The rotation also provides a means of spectral control. If the upstream portion of the beam is rotated to the feedback side of the beam, the spectra will be prejudiced in favor of those spectral lines which dominate in the upstream portion of the beam (low J lines in the case of DF or HF chemical laser). If the downstream portion is rotated to the feedback side spectra lines dominant in the downstream portion of the beam are favored (high J lines in HF or DF lasers). In other words, the self-reproducing ray moves upstream or downstream depending on the direction of beam rotation.

Obviously, many modifications and variations of the present invention are possible in light of the above teachings. It is therefore to be undestood that, within the scope of the appended claims, the invention may be practiced otherwise than as specifically described.

What is claimed and desired to be secured by Letters Patent of the United States is:

1. In an off-axis, unstable, ring-resonator laser having a rectangular feedback beam, the improvement comprising:
a 90° beam rotator in the feedback beam path for rotating the feedback beam by 90° to provide mode control by keeping self-reproducing rays away from the edge of the resonator; and astigmatic magnification means for producing different x and y magnifications on the axes of said feedback beam to fill an aspect ratio of a gain medium by a magnified beam which is different from an aspect ratio of the feedback beam after rotation.

2. The improvement of claim 1, wherein:
the beam rotator is an astigmatic 3-mirror out-of-plane rotator.

3. The improvement of claim 2, wherein:
said magnification means and said astigmatic rotator comprise a single unit.

* * * * *